Oct. 18, 1960  E. V. SCHNEIDER  2,956,440
PHONOGRAPH MECHANISM
Filed June 3, 1950  2 Sheets-Sheet 2

INVENTOR.
EMMOR V. SCHNEIDER
BY Woodling ed Kvost
attys.

Oct. 18, 1960     E. V. SCHNEIDER     2,956,440
PHONOGRAPH MECHANISM
Filed June 3, 1950     2 Sheets-Sheet 1
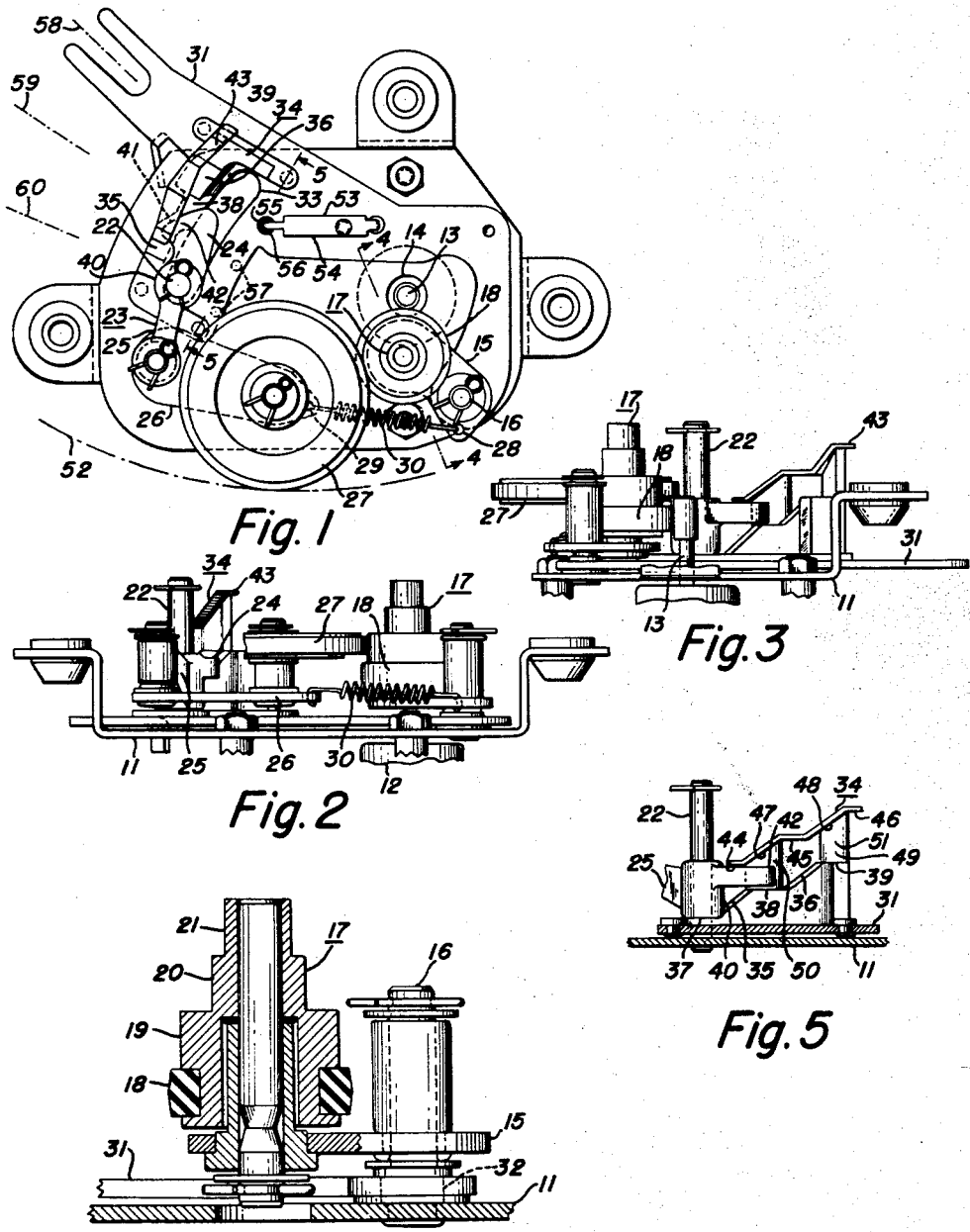
INVENTOR.
EMMOR V. SCHNEIDER

United States Patent Office 2,956,440
Patented Oct. 18, 1960

2,956,440

PHONOGRAPH MECHANISM

Emmor V. Schneider, Alliance, Ohio, assignor, by mesne assignments, to The Alliance Manufacturing Company, Division of Consolidated Electronics Industries Corporation, Alliance, Ohio, a corporation of Delaware Filed June 3, 1950, Ser. No. 166,035

7 Claims. (Cl. 74—199)

The invention relates in general to plural speed drives and more particularly to plural speed phonographic turntable drives wherein an axially stepped rotatable member and a second rotatable member are relatively movable in directions parallel to and perpendicular to the axes of the members.

An object of the invention is to provide a phonographic turntable plural speed drive mechanism wherein a wheel is axially and transversely movable relative to an axially stepped revoluble member to be frictionally driven therefrom.

Another object of the invention is to provide a plural speed phonographic drive mechanism wherein two separate cams are used, the first to provide relative axial movement between a stepped revoluble member and a second member, and the second to provide relative separation of the axes of these members.

Another object of the invention is to provide a movable plate carrying first and second cams cooperating with first and second cam followers, respectively, which act upon a wheel in a plural speed phonographic drive mechanism to move the wheel in a U-shaped path which first moves the wheel from a stepped revoluble member, then axially moves the wheel and then effects a return of the wheel to frictional engagement with another step of the stepped revoluble member.

Another object of the invention is to provide a cam and cam follower in a plural speed drive mechanism which includes a stepped member and a wheel wherein the cam and follower effect relative axial displacement of the members and means other than this cam and follower is provided for effecting a relative separation of the axes of these members.

Still another object of the invention is to provide a cam and follower mechanism in a plural speed drive including a stepped revoluble member and a second wheel member wherein the cam and follower provide relative separation of the axes of these members and means other than this cam and follower is provided for effecting relative axial displacement of these members.

Other objects and a fuller understanding of the invention may be had by referring to the following description and claims, taken in conjunction with the accompanying drawings, in which:

Figure 1 is a plan view of a phonographic turntable mechanism having two cams for relative axial and transverse movement of two wheels in the drive mechanism;

Figure 2 is a front elevational view of the phonographic drive mechanism of Figure 1;

Figure 3 is an end elevational view of the mechanism of Figures 1 and 2;

Figure 4 is an enlarged sectional view taken along the line 4—4 of Figure 1;

Figure 5 is an isometric view of the cam and cam follower mechanism, taken on the line 5—5 of Figure 1;

Figure 6:
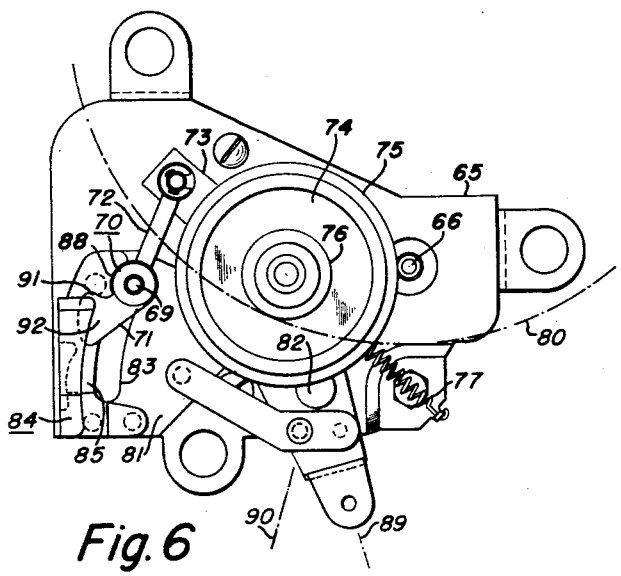
Figure 6 is a plan view of a modification of the invention.

The Figures 1–4 show the preferred embodiment of the invention wherein 11 is a motor plate or cabinet plate dependently supporting a motor 12. The motor 12 has a vertically extending motor shaft 13 which extends through an aperture 14 in the cabinet plate 11. A fulcrum plate 15 is pivoted at 16 to the cabinet plate 11, and journaled in the outer end thereof is a step wheel 17. The step wheel has a rubber tire 18 and first, second and third step portions 19, 20 and 21, respectively. The rubber tire 18 is disposed to contact the protruding upper end of the motor shaft 13. A stud 22 is fixedly carried by the cabinet plate 11, and an idler link 23 is carried on the stud 22 for axially sliding and at least partially rotational movements. The idler link 23 has a first arm 24 and a second arm 25 disposed generally opposite the first arm. Journaled to the end of the second arm 25 is an idler plate 26, and journaled to the idler plate 26 is an idler wheel 27. The idler wheel 27 is thus free floating, within limits, in a plane substantially perpendicular to the step wheel 17. Further, the idler wheel 27 is adapted to be disposed in each of three planes wherein it may contact the first, second and third step portions 19, 20 and 21. An aperture 28 is provided in the fulcrum plate 15, and a second aperture 29 is provided in the idler plate 26. An idler spring 30 engages the apertures 28 and 29 to urge the idler wheel 27 toward the step wheel 17 which in turn is urged against the motor shaft 13. The idler wheel 27 is adapted to frictionally drive the inside of a phonographic turntable rim, shown by the dot-dash arc 52.

A shift plate 31 has a bearing 32 pivoted at the pivot 16. The shift plate 31 has a large aperture 33 formed on radii from the pivot 16 to encompass the stud 22. The shift plate 31, therefore, has a limited arcuate movement relative to the cabinet plate 11. A cam member 34 is fixedly carried by the shift plate 31 and has first and second inclined planes 35 and 36, respectively, which join first, second and third plane surfaces 37, 38 and 39. The idler link 23 has a hub 40 which is shown in the Figures 1, 2 and 3 as being superjacent the first plane surface 37 and which is adapted to act as a cam follower with the surfaces 35–39 acting as cams. The first arm 24 of the idler link 23 has a finger 41 which has an upper surface 42. The cam member 34 has a vertically extending section 49 which includes an overhanging ledge 43, and the underside of this ledge has first, second and third horizontal plane surfaces 44, 45 and 46 which are joined together by first and second inclined planes 47 and 48. The vertically extending section 49 also has first and second vertical cam surfaces 50 and 51, respectively, adapted to engage the end of the finger 41.

A detent mechanism 53 includes a flat spring 54 affixed to the shift plate 31, and a detent ball 55 is pressed by the flat spring 54 against the cabinet plate 11. The detent ball 55 is carried in an aperture 56 in the shift plate 31 and is adapted to drop into one of three depressions 57 in the cabinet plate 11 in order to hold the shift plate 31 in one of first, second and third positions 58, 59 and 60, respectively.

In operation the plural speed phonographic drive mechanism is effected from the motor shaft 13 to the rubber tire 18 which is fixed to the step wheel 17, then from one of the step portions 19, 20 or 21 to the idler wheel 27, and thence to the turntable rim 52. The idler spring 30 urges the step wheel 17 against the motor shaft 13 and also urges the idler wheel 27 against the step wheel 17 and against the turntable rim 52.

The shifting mechanism of the invention provides for shifting the idler wheel 27 so that the frictional drive train is effected through a selected one of the three step portions 19, 20 and 21, thus giving a selection of speed of the phonographic turntable 52. The shift plate 31 carries the cam member 34, and the inclined planes 35 and 36 and the plane surfaces 37, 38 and 39 constitute a first cam which operates upon the underside of the hub 40 as a cam follower. Thus, it will be seen that as the shift plate 31 is shifted in a counterclockwise direction, as viewed in Figure 1, the hub 40 will shift the idler link 23 in an axial direction. This will vertically upwardly move the idler wheel 27.

The shift plate 31 has been shown in the Figures 1–3 of the drawings as being in the first position 58. The detent mechanism 53 is adapted to temporarily restrain the shift plate 31 relative to the cabinet plate 11 in each of the three positions 58, 59 and 60. When the shift plate 31 is moved counterclockwise from the first position 58 to the second position 59, the hub 40 will ride from the first plane surface 37 up the first inclined plane 35 to the second plane surface 38. Further movement of the shift plate 31 to the third position 60 will cause the hub 40 to ride up the second inclined plane 36 to the third plane surface 39. These movements will successively bring the idler wheel 27 into the plane of the second step portion 20, and then the third step portion 21 from the original position of the plane of the first step portion 19.

The first and second vertical cam surfaces 50 and 51 will cooperate with the finger 41 during movement of the cam member 34 relative to the stud 22. The vertical cam surface 50 will act upon the finger 41 as a cam follower to first rotate the idler link 23 in a clockwise direction, as viewed in Figure 1, as the shift plate 31 begins to move counterclockwise. This initial clockwise rotation of the idler link 23 pulls the idler wheel 27 away from the step wheel 17 against the urging of the idler spring 30. Just before the shift plate 31 reaches the second position 59 the contour of the first vertical cam surface 50 is such as to permit the idler spring 30 to rotate the idler link 23 in a counterclockwise direction and hence to return the idler wheel 27 against the step wheel 17. Since the hub 40 has been vertically lifted, the idler wheel 27 will now be in contact with the second step portion 20. During further counterclockwise movement of the shift plate 31 from the second position 59 to the third position 60, the second vertical cam surface 51 will act upon the finger 41 as a cam follower to first rotate the idler link 23 in a clockwise direction and then, as the third position 60 is reached, the idler link 23 is permitted to rotate in a counterclockwise direction under the urging of the idler spring 30. Since the hub 40 has been lifted to the level of the third plane surface 39, the idler wheel 27 will now be in engagement with the third step portion 21.

When the shift plate 31 is rotated in a clockwise direction from the third position 60, the finger 41 will again cooperate as a cam follower with the second vertical cam surface 51 and then with the first vertical cam surface 50. This cooperation of the finger with the vertical cam surfaces in each case will retract the idler wheel horizontally from the step wheel 17, and then permit the idler wheel to return horizontally to engagement with the step wheel 17 under the urging of the idler spring 30. Thus, the vertical cam surfaces 50 and 51 constitute a second cam for cooperation with the end of the finger 41 as a cam follower. Further, as the shift plate 31 is moved in a clockwise direction the upper surface 42 of the finger 41 will engage the underside of the overhanging ledge 43. The horizontal plane surfaces 44, 45, 46 and the first and second inclined planes 47 and 48 of this overhanging ledge 43 make a third cam which cooperates with the upper surface 42 of the finger 41 as a cam follower. As the shift plate 31 is moved from the third position 60 to the second position 59, the upper surface 42 of the finger 41 will be cammed downwardly by the second inclined plane 48 until it rests in engagement with the second horizontal plane surface 45. As the shift plate 31 continues to the first position 58 the finger 41 will be cammed downwardly by the first inclined plane 47 until it contacts the first horizontal plane surface 44.

It will be seen, therefore, that movement of the shift plate 31 from one position to the next successive position will first cause the idler wheel 27 to be retracted horizontally from the step wheel 17, the idler wheel is next vertically and axially moved under the influence of another cam and cam follower, and finally the idler wheel 27 is permitted to return horizontally into engagement with another step portion of the step wheel 17 under the urging of the idler spring 30.

Figure 8:
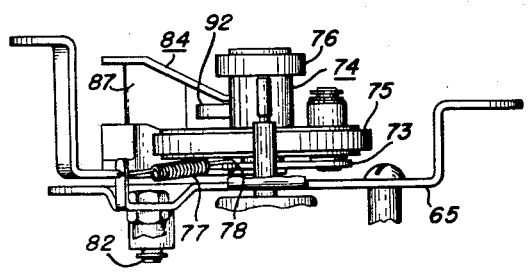
Figure 8 is an end elevational view of the modification shown in Figure 6.
Figure 7:
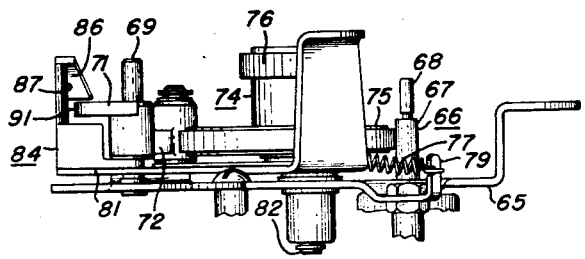
Figure 7 is a front elevational view of the modification shown in Figure 6.

The Figures 6, 7 and 8 show a two-speed modification of the invention wherein a cabinet plate 65 carries a revoluble drive shaft 66 having a first and a second step portion 67 and 68, respectively. A stud 69 is fixedly carried by the cabinet plate 65 and an idler link 70 is carried on the stud 69 for axially slidable and at least partially rotative movements. The idler link 70 has first and second substantially opposite arms 71 and 72 with an idler plate 73 journaled in the second arm 72. The first arm 71 has a finger 91 with an upper surface 92. A stepped friction wheel 74 is journaled in an idler plate 73, and hence this wheel will have two-dimensional floating movements in a plane substantially perpendicular to the drive shaft 66. The stepped friction wheel 74 has first and second portions 75 and 76 with the first portion 75 adapted to frictionally engage the drive shaft 66 under urging of an idler spring 77 which engages an aperture 78 in the idler plate 73 and a lug 79 on the cabinet plate 65. The idler spring 77 urges the friction wheel 74, not only toward the drive shaft 66 but toward a small-diameter turntable shown by the arc 80. The second portion 76 of the friction wheel 74 is adapted to contact this turntable rim 80.

A shift plate 81 is pivoted at 82 to the cabinet plate 65 and has a radial aperture 83 encompassing the stud 69. A cam member 84 is carried by the shift plate 81, and this cam member 84 has first, second and third cams 85, 86 and 87, respectively. The first cam 85 engages the underside of the hub 88 of the idler link 70, and as the shift lever 81 is rotated in a clockwise direction, as seen in Figure 6, from a first position 89 to a second position 90, the cam member 84 is moved, and hence the first cam 85 bears against the hub 88 to raise this hub vertically a distance sufficient that the first portion 75 is now in the plane of the second step portion 68 of the drive shaft 66. During this clockwise movement the third cam 87 cooperates with the finger 91 of the first arm 71 to give a partial counterclockwise rotation to the idler link 70, and hence retract the friction wheel 74 against the urging of the idler spring 77. During the final clockwise movement of the shift plate 81, the third cam 87 has a contour such that the idler spring 77 is permitted to again return the friction wheel 74 so that the first portion 75 thereof is in contact with the drive shaft 66. Actually it will be in contact with the second step portion 68 of this drive shaft 66, since the friction wheel 74 has been shifted axially to the plane of this second step portion 68.

On moving the shift plate 81 in a counterclockwise direction from the second position 90 to the first position 89, the finger 91 of the idler link 70 will again act as a cam follower cooperating with the third cam 87, and the initial movement will retract the friction wheel 74 from the drive shaft 66, and the final movement of the shift plate 81 will, because of the contour of the third cam 87, permit the idler spring 77 to return the friction wheel 74 into frictional contact with the drive shaft 66. During this counterclockwise rotation of the shift plate 81, the upper surface 92 of the finger 91 wll contact the second cam 86. As best seen in Figure 7, this second cam 86 takes the form of an overhanging ledge which includes an inclined plane. Thus, as the cam member 84 is moved in a counterclockwise direction, this second cam 86 will act upon the upper surface 92 as a cam follower to cam the idler link 70 downwardly, and thus the first portion 75 of the friction wheel 74 will return to the plane of the first step portion 67 of the drive shaft 66. It will thus be seen that the action of the modification shown in the Figures 6, 7 and 8 is essentially the same as that mode of operation of the preferred embodiment except that only a two-speed frictional drive has been provided rather than a three-speed drive.

It will be seen that the second cam 86 could be dispensed with and replaced by a spring which continually urges the underside of the hub 88 into contact with the first cam 85 and the movement would remain essentially the same. Likewise, the second cam 86 could remain and the first cam 85 eliminated with a spring acting on the idler link 70 to urge it upwardly into contact with the second cam 86. Such changes could also be effected for the preferred embodiment shown in Figures 1-5.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a plural speed phonographic turntable drive having an axially stepped revoluble drive member and a two dimensionally free floating revoluble friction member adapted to effect a frictional drive of the turntable from the drive member under urging of a spring, the provision of a shift mechanism to provide drive of said turntable from either of said drive member steps, said mechanism including a shift plate movable relative to the axis of said drive member, first and second cams on said shift plate, and first and second cam followers on one of said friction and stepped drive members, said first cam and follower providing relative separation of said friction and drive member axes during movement of said shift plate, and said second cam and follower providing substantially only relative axial displacement of said friction and stepped drive members.

2. A plural speed drive for a phonographic turntable having a flange, comprising, a plate, a drive member with axially stepped portions revoluble relative to said plate, a stud carried by said plate, a cam follower having a hub journaled to and axially slidable on said stud, a revoluble friction wheel carried by said cam follower to be free floating relative to said stud in a plane substantially perpendicular to said drive member axis, means urging said friction wheel into engagement with said drive member and adapted to urge said friction wheel into engagement with said turntable flange, a first cam movable relative to said plate and disposed to engage the hub of said cam follower to axially shift said hub in one direction, and a second cam attached to said first cam and disposed to engage said cam follower to relatively separate said friction wheel and said drive member.

3. A plural speed drive for a phonographic turntable having a flange, comprising, a cabinet plate, a drive member with axially stepped portions journaled relative to said cabinet plate, a stud fastened to said plate, a cam follower having a hub journaled to and axially slidable on said stud, said cam follower having an arm extending from said hub, an idler plate journaled to said arm to thus be free floating relative to said stud in a plane substantially perpendicular to the axis of said drive member, a friction wheel journaled on said idler plate, spring means urging said friction wheel into engagement with said drive member and adapted to urge said friction wheel into engagement with said turntable flange, a shift plate movable relative to said cabinet plate, a first cam on said shift plate disposed to engage the hub of said cam follower to axially shift said hub in one direction upon movements of said shift plate in one direction, and a second cam on said shift plate disposed to engage said cam follower to overcome said spring means during shifting operations and thus withdraw said friction wheel from engagement with at least said drive member.

4. A plural speed drive for a phonographic turntable having a flange, comprising, a cabinet plate, a drive member with axially stepped portions and journaled relative to said cabinet plate, a stud fastened to said plate, a cam follower having a hub journaled to and axially slidable on said stud, said cam follower having first and second oppositely extending arms, an idler plate journaled to said second arm to thus be free floating relative to said stud in a plane substantially parallel to said cabinet plate, a friction wheel journaled on said idler plate, spring means urging said friction wheel into engagement with said drive member and adapted to urge said friction wheel into engagement with said turntable flange, a shift plate pivoted to said cabinet plate, a first cam on said shift plate disposed to engage the hub of said cam follower to axially shift said hub in at least one of alternate directions upon pivotal movements of said shift plate in at least one of alternate directions, and a second cam on said shift plate disposed to engage said first arm to overcome said spring means during shifting operations and thus withdraw said friction wheel from engagement with at least said drive member.

5. A plural speed drive for a phonographic turntable having a flange, comprising, a cabinet plate, a revoluble drive member with axially stepped portions and journaled relative to said cabinet plate, a stud fastened to said plate, a cam follower having a hub journaled to and axially slidable on said stud, said cam follower having first and second oppositely extending arms, an idler plate journaled to said second arm to thus be free floating relative to said stud in a plane substantially parallel to said cabinet plate, a friction wheel journaled on said idler plate, spring means urging said friction wheel into engagement with said revoluble drive member and adapted to urge said friction wheel into engagement with said turntable flange, a shift plate pivoted to said cabinet plate, a first cam on said shift plate disposed to engage the hub of said cam follower to axially shift said hub in a first direction upon pivotal movements of said shift plate in a first direction, a second cam on said shift plate disposed to engage said first arm to overcome said spring means during said first directional movement of said shift plate and thus withdraw said friction wheel from engagement with at least said revoluble drive member, and a third cam on said shift plate disposed to engage a part of said first arm to axially shift said hub in the opposite axial direction upon pivotal movements of said shift plate opposite to said first direction, and said second cam again engaging said first arm to overcome said spring means during said opposite directional movement of said shift plate and thus withdrawing said friction wheel from engagement with at least said revoluble drive member.

6. A three speed drive for a phonographic turntable having a flange, comprising, a cabinet plate, a drive member with three axially stepped portions journaled relative to said cabinet plate, a stud fastened to said plate, a cam follower having a hub journaled to and axially slidable on said stud, said cam follower having an arm extending from said hub, an idler plate journaled to said arm to thus be free floating relative to said stud in a plane substantially perpendicular to the axis of said drive member, a friction wheel journaled on said idler plate, means urging said friction wheel into engagement with said drive member and adapted to urge said friction wheel into engagement with said turntable flange, a shift plate movable relative to said cabinet plate, a first cam on said shift plate disposed to engage the hub of said cam follower to axially shift said hub in one direction into one of three distinct planes upon movements of said shift plate in one direction, and a second cam on said shift plate disposed to engage said cam follower to overcome said urging means during shifting operations between said distinct planes and thus withdraw said friction wheel from engagement with at least said drive member.

7. In a phonograph of the type wherein is a turntable having a depending marginal flange and below the turntable a motor provided with a vertically upstanding shaft, together with a multi-speed power transmission therebetween, the features of improvement which comprises a plurality of driving pulleys of different diameters, rotatable about a common vertical axis, arranged at levels which are opposite the depending flange of the turntable, and mounted to be driven in unison from the motor shaft, a friction wheel having a vertical axis, a mounting for the friction wheel, shiftable both horizontally and vertically, to position the wheel for concurrent engagement with any selected pulley and the turntable flange to transmit motion from the former to the latter, a pivotally mounted horizontal plate having an arcuate slot concentric with its pivotal axis, a compound cam carried by the plate and extending arcuately adjacent the slot thereof, a fixedly mounted post extending vertically through the plate slot to support the friction wheel mounting for horizontal and vertical movements thereon, the plate, when moved, operating through the cam to produce opposite horizontal shifts of the wheel mounting, one before and the other after each vertical shift thereof, and a spring in connection with the wheel mounting and urging the same to a position where the wheel is held in frictional engagement with both the turntable flange and the co-level driving pulley to assure transmission of motion from the later to the former.

References Cited in the file of this patent

UNITED STATES PATENTS

| | | |
|---|---|---|
| 1,239,272 | Henriod-Schweizer | Sept. 4, 1917 |
| 1,381,866 | Gherassimoff | June 14, 1921 |
| 2,248,384 | Redin | July 8, 1941 |
| 2,438,264 | Bender | Mar. 23, 1948 |
| 2,438,265 | Metzner | Mar. 23, 1948 |
| 2,584,580 | Hardy | Feb. 5, 1952 |
| 2,746,306 | Hartman | May 22, 1956 |